United States Patent
Frantin

(10) Patent No.: US 8,454,289 B2
(45) Date of Patent: Jun. 4, 2013

(54) STAPLE HOLDING PRONG

(76) Inventor: Walter Frantin, Park Ridge, NJ (US)

(*) Notice: Subject to any disclaimer, the term of this patent is extended or adjusted under 35 U.S.C. 154(b) by 0 days.

(21) Appl. No.: 12/551,791

(22) Filed: Sep. 1, 2009

(65) Prior Publication Data

US 2011/0052346 A1 Mar. 3, 2011

(51) Int. Cl.
*F16B 15/00* (2006.01)

(52) U.S. Cl.
USPC .......................... 411/476; 411/457

(58) Field of Classification Search
USPC .............. 411/451.5, 456–460, 469, 475, 476, 411/921, 920, 923, 470, 473, 474; 40/661.11, 40/661.04, 688, 669; 81/44
See application file for complete search history.

(56) References Cited

U.S. PATENT DOCUMENTS

| | | | |
|---|---|---|---|
| 214,166 A | 4/1879 | McGill | |
| 975,235 A | 11/1910 | Hansen | |
| 1,614,831 A | 5/1925 | Crofoot | |
| 1,914,951 A | 7/1932 | Kiessling | |
| 2,127,665 A * | 8/1938 | Leslie | 29/413 |
| 2,161,632 A * | 6/1939 | Nattenheimer | 411/473 |
| 3,741,068 A | 6/1973 | Andruskiewicz | |
| 4,288,057 A | 9/1981 | Sainsbury, Jr. | |
| 4,378,065 A * | 3/1983 | Smirne | 206/230 |
| 5,062,753 A * | 11/1991 | Begue | 411/470 |
| 5,112,177 A * | 5/1992 | Chamings | 411/447 |
| 5,236,168 A | 8/1993 | Roy | |
| 5,314,160 A * | 5/1994 | Larsen | 248/547 |
| D368,650 S | 4/1996 | Wastermark | |
| D427,896 S | 7/2000 | Pezzella | |
| D429,628 S | 8/2000 | Peters | |
| 6,299,400 B1 * | 10/2001 | Tebo | 411/459 |
| 6,899,501 B2 * | 5/2005 | LoGiudice | 411/457 |

* cited by examiner

*Primary Examiner* — Gary Estremsky
(74) *Attorney, Agent, or Firm* — Heslin Rothenberg Farley & Mesiti P.C.

(57) ABSTRACT

A staple with a breakaway staple holding prong enables a person to more easily observe, hold, position, prepare and/or steady the staple for driving and embedding into a structure. The person can hold the breakaway staple holding prong with two or more fingers of one hand and drive and embed the staple into the structure with the other hand, while minimizing or eliminating the possibility that the incoming blows of the other hand will come into contact with and harm the fingers of the hand holding the staple. The staple includes a first nail prong and a second nail prong connected by a member, creating a substantially U-shaped body, the staple further including a breakaway staple holding prong coupled to the substantially U-shaped body.

19 Claims, 5 Drawing Sheets

STAPLE HOLDING PRONG

TECHNICAL FIELD

The present invention is directed towards a staple with a breakaway staple holding prong to enable a person to more easily observe, hold, position, prepare and/or steady the staple for driving and embedding into a structure.

BACKGROUND INFORMATION

A staple is a type of two-pronged fastener used for joining or binding various materials together. Often staples are used to secure one or more cables, wires, lines, tubes or a combination thereof, to a contiguous or adjacent surface, such as wood, plaster or drywall.

Generally, in order to secure one or more cables to a surface, the person positions the two nail prongs on either side of the cable or cables desired to be secured to the structure, then drives or hammers the staple into the structure with one hand, while holding and positioning the staple and holding the wire, or in the case of two ore more wires, collecting and cradling the wires with the other hand, whereby the staple surrounds the cables on three sides and affixing the cables to the structure.

However, multiple difficulties are encountered when a person tries to hold the cable to be secured, or in the case of two or more cables, collect and cradle the cables, while at the same time holding and positioning the staple with one hand, and hammering the staple with the other hand without striking the fingers used to hold and position the staple. Thus, the most disadvantageous aspect is the lack of space on the staple to enable a person to hold the staple with one hand while driving the staple into the structure with the other hand without striking the fingers holding the staple.

To make matters more complicated, in many cases, the structures to which the cable or cables are desired to be secured exist over and above the head of a person, for example, as is the case when an person secures an electrical cable to the ceiling of a cellar. It is difficult to hold and maintain the staple in the desired position, and at the same time with the same hand, hold the wire, or in the case of two or more wires, cradle and collect the wires when there is little room for that hand to grasp the staple and still sufficiently free the fingers enough to avoid being struck by the incoming blows of the other hand holding the hammer. Specifically, the difficulty is exacerbated when the wire or wires must be secured over and above the head of the person due to the constant downward effects of gravity.

It is therefore an object of the present invention to provide an improved staple which provides adequate space for the person to hold the staple such as to minimize or eliminate the possibility that the incoming blows of the striking hammer will contact the fingers of the hand holding the staple.

SUMMARY OF THE INVENTION

The problems of the prior art have been overcome by the present invention, which provides a staple with a breakaway staple holding prong to allow a person to more easily observe, hold, position, prepare and/or steady the staple for driving and embedding the same into a structure while minimizing or eliminating the possibility that the incoming blows of the striking hammer will contact the fingers of the hand holding the staple.

An aspect of the present invention relates to a staple, comprising a first nail prong and a second nail prong connected by a member, creating a substantially U-shaped body, the staple further comprising a breakaway staple holding prong coupled to the substantially U-shaped body.

A second aspect of the present invention relates to a method of using the staple as described above. The method includes providing a staple, which comprises a first nail prong and a second nail prong connected by a member, thereby creating a substantially U-shaped body. The staple further comprises a breakaway staple holding prong coupled to the substantially U-shaped body. A person than grasps the breakaway staple holding prong using one hand to hold the staple in a desired location for embedding same; and embeds the staple in the desired location using the other hand.

BRIEF DESCRIPTION OF THE DRAWINGS

These and other features, aspects and advantages of the present invention will become apparent from the following description of preferred embodiments, when read in conjunction with the accompanying drawings, in which.

DETAILED DESCRIPTION OF THE INVENTION

Throughout the specification the terms and substituents are defined when first introduced and retain their definitions.

The present invention relates to a staple with a breakaway staple holding prong sized and configured to allow a person to grasp the staple holding prong with his or her fingers, so that the person can more easily observe, hold, position, prepare and/or steady the staple for driving and embedding the staple into a structure, while at the same time minimizing or eliminating the possibility that the incoming blows of the striking hammer will come into contact with the fingers of the hand holding the staple thereby harming the fingers.

Figure 1:
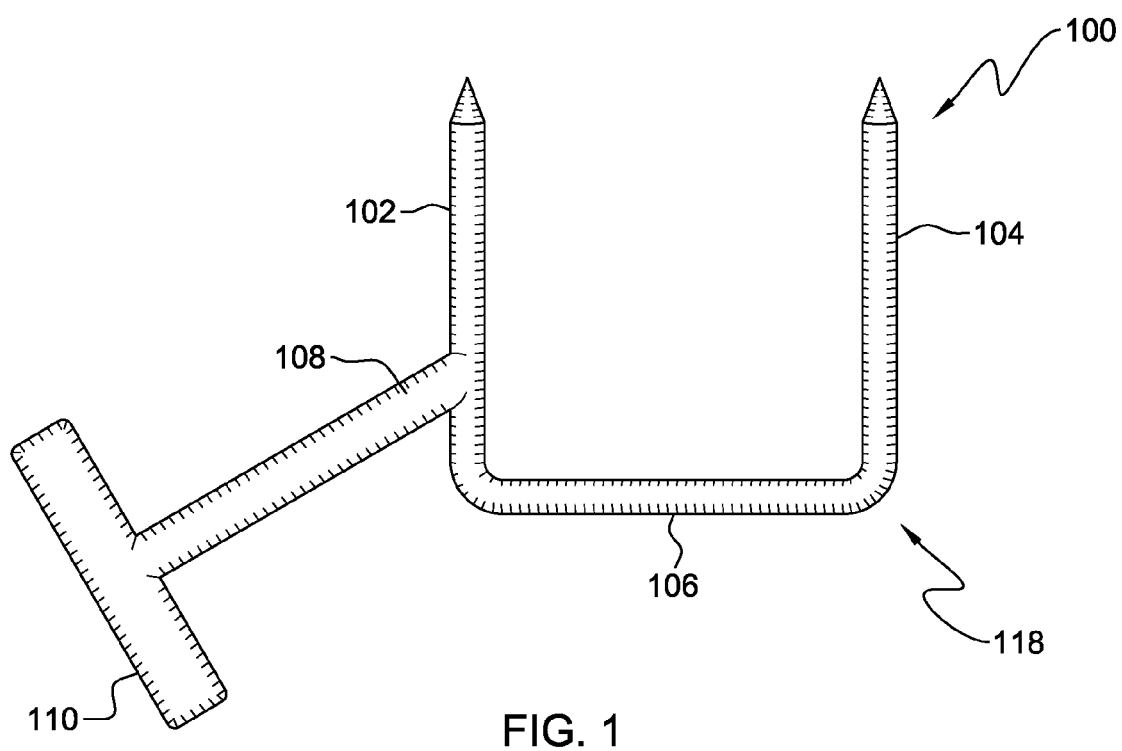
FIG. 1 is a front or back view of one example of a staple with a breakaway staple holding prong in accordance with an aspect of the present invention.

Turning first to FIG. 1, a staple 100 includes a first nail prong 102 and a second nail prong 104. The first nail prong 102 and the second nail prong 104 are connected by a member 106, thereby creating a substantially U-shaped body 118. The staple 100 also includes a breakaway staple holding prong 110 coupled to the substantially U-shaped body 118. The breakaway staple holding prong 110 includes a breakaway section 108 that connects the breakaway staple holding prong 110 to the staple 100 to enable removal of the breakaway staple holding prong 110 from the staple 100 after the staple 100 has been partially or substantially embedded in the structure.

Figure 6:
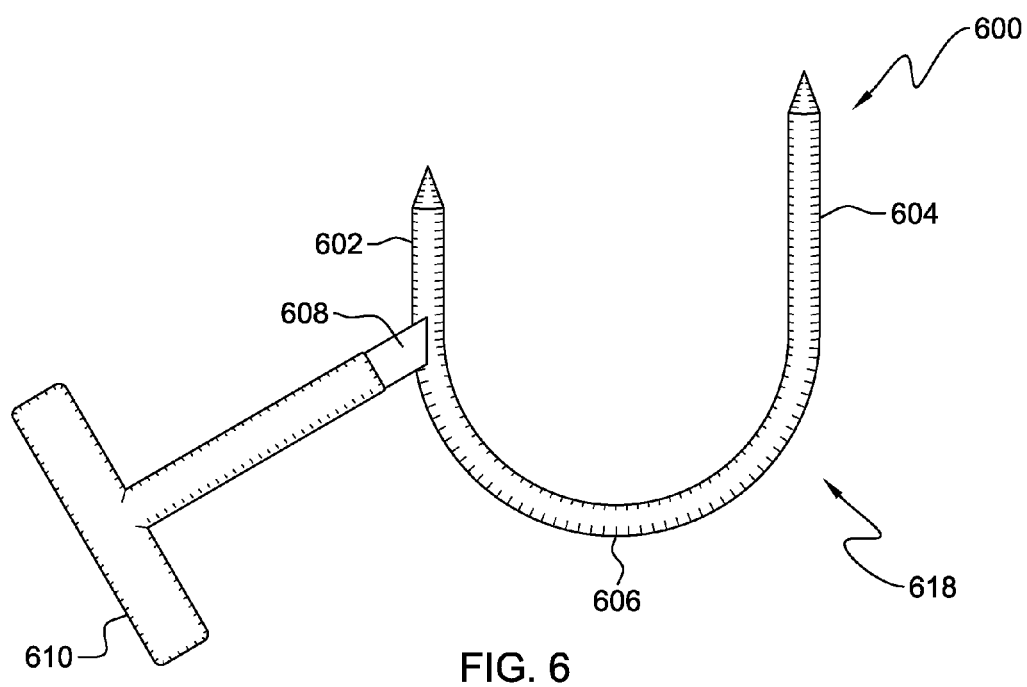
FIG. 6 is a front or back view of one example of a staple with a breakaway staple holding prong having a substantially rounded u-shaped body in accordance with another aspect of the present invention.

The member 106 is configured so as to receive blows from an incoming hammer or other striking device thereby driving the staple 100 into a structure. In one embodiment, the member 106 is arranged perpendicularly between the first nail prong 102 and the second nail prong 104, thereby creating a substantially squared U-shaped body. The member 106 may also be formed in other configurations. For example, as shown in FIG. 6, the member 606 may be rounded or arced, thereby creating a substantially rounded U-shaped body 618.

The breakaway staple holding prong 110 is sized and configured so as to allow a person to grasp the breakaway staple holding prong 110 with two or more fingers of one hand, for example, the thumb and index finger, while striking the staple 100 with the other hand, so that the person can more easily observe, hold, position, prepare and/or steady the staple 100 for driving the first nail prong 102 and the second nail prong 104 of staple 100 into the structure, while at the same time minimizing or eliminating the possibility that the incoming blows of the striking hammer will come into contact with and harm the fingers of the hand holding the staple 100.

Figure 3:
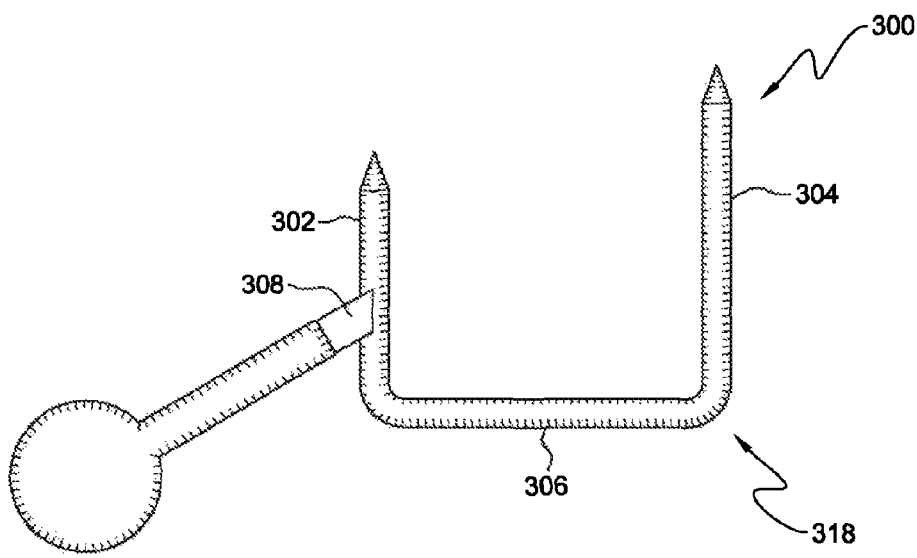
FIG. 3 is a front or back view of one example of a staple with a breakaway staple holding prong wherein the free end of the breakaway staple holding prong comprises a disc-shaped tab in accordance with another aspect of the present invention and wherein one of the first nail prong and the second nail prong is shorter than the other in accordance with the present invention.
Figure 7:
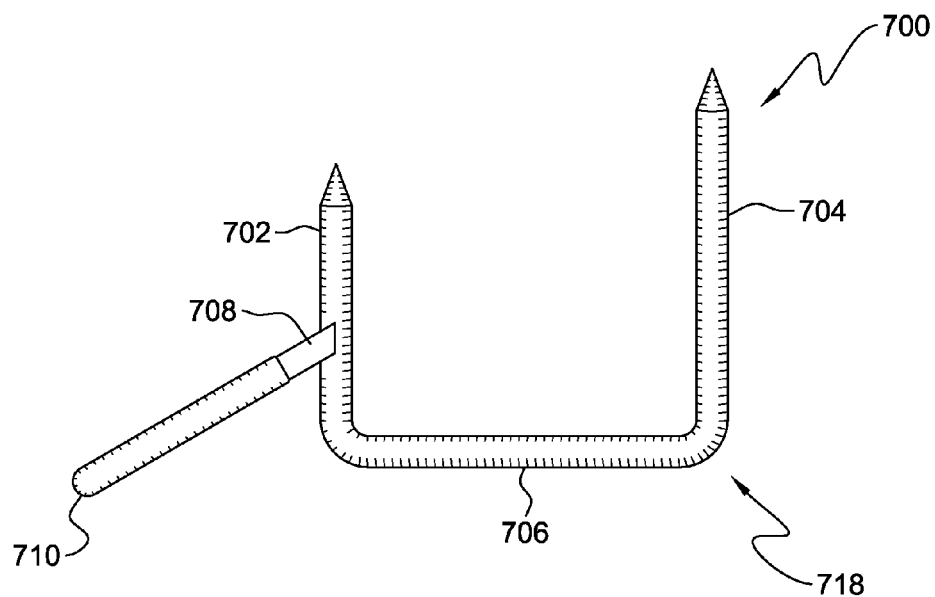
FIG. 7 is a front or back view of one example of a staple with a breakaway staple holding prong wherein the breakaway staple holding prong is substantially cylindrical in accordance with another aspect of the present invention.

The breakaway staple holding prong 110 may be formed of different lengths, depending on the application. The breakaway staple holding prong may also be formed of different sizes and shapes so as to allow a person to grasp the breakaway staple holding prong 110 with two or more of his or her fingers. For example, the breakaway staple holding prong 110 may be flat (FIG. 1) or the breakaway staple holding prong 710 may be cylindrical (FIG. 7). As depicted in FIG. 1, the staple holding prong 110 may be, for example, substantially flat and T-shaped in cross section. In an alternate embodiment shown in FIG. 7, the staple holding prong 710 may be, for example, substantially cylindrical and peg-shaped in cross section. Turning to FIG. 3, the breakaway staple holding prong 310 may be, for example, a tab with a free end to enable grasping by two or more fingers and a second end that is coupled to the staple 300. For example, breakaway staple holding prong 310 is a tab, with disc-shaped free end.

The breakaway staple holding prong 110 may be coupled to the staple 100 at various locations and at various angles. As depicted in the example of FIG. 1, the breakaway staple holding prong 110 may be connected to the first nail prong 102. Such a configuration is useful for a right-handed person, enabling the person to hold the breakaway staple holding prong 110 with two or more fingers of his or her left hand, hold the hammer or other striking device in the right hand, and strike the member 106 using the right hand so as to drive the staple 100 into the desired structure. A left-handed person can simply rotate the staple 180 degrees in a direction perpendicular to the structure in which the staple 100 is being secured, so as to grasp the breakaway staple holding prong 110 with two or more fingers of his or her right hand, hold the hammer or other striking device in the left hand, and strike the member 106 using the left hand so as to drive the staple 100 into the desired structure. Alternatively, the staple holding prong 110 can be connected to the second nail prong 104.

In one embodiment, the breakaway staple holding prong 108 may be releasably connected to the staple 100 so that a person can remove the breakaway staple holding prong 110 from the staple 100 after the staple 100 has been partially or substantially embedded in the structure. For example, the breakaway staple holding prong 110 may be removed from the staple 100 by grasping the breakaway staple holding prong 110 and bending the breakaway staple holding prong 110 such that the breakaway staple holding prong 110 breaks free and can be removed from the staple 100

Figure 2:
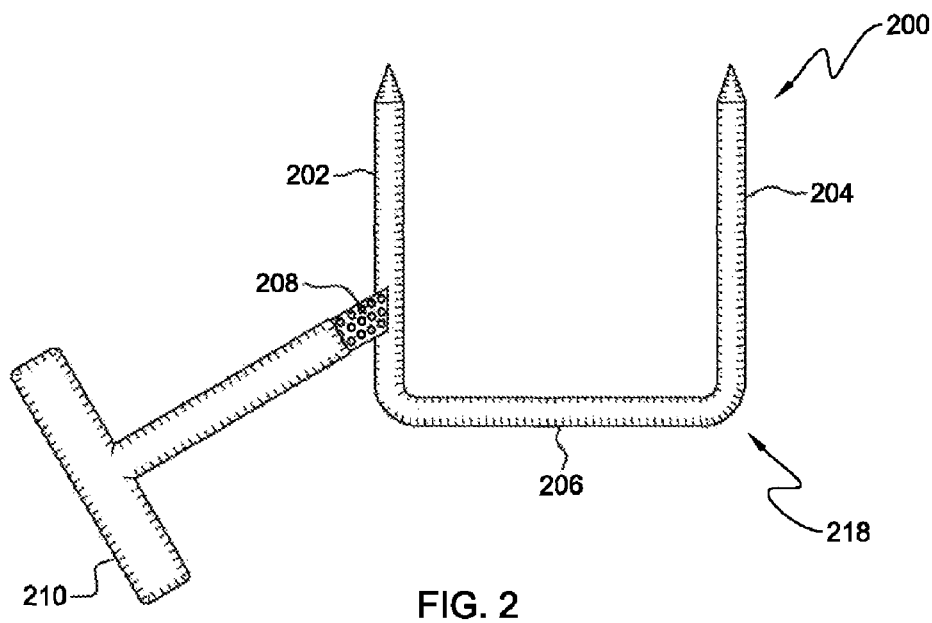
FIG. 2 is a front or back view of one example of a staple with a breakaway staple holding prong having a weakened breakaway section in accordance with another aspect of the present invention.

Turning to FIG. 2, the breakaway section 208 may, for example, be weakened so as to facilitate removal of the breakaway staple holding prong 210 prong from the staple 200 after the staple 200 is partially or substantially embedded in the structure. As shown in FIG. 2, in one embodiment, the breakaway section 208 is located immediately adjacent the staple 200. In another embodiment, the material comprising the breakaway section 208 may be thinner than the material forming the rest of the breakaway staple holding prong 210, thereby weakening the breakaway section 208 and facilitating breakage. The breakaway section 208 could instead, as another example, be partially cut or partially detached from the staple 200 to facilitate breakage once the staple 200 is partially or substantially embedded in the structure. In another embodiment, the breakaway section 208 may be perforated so as to enable removal of the breakaway staple holding prong from the staple 200.

Referring back to FIG. 1, the staple 100 may be formed from one or more of a variety of materials, such as, metal, metal alloy or plastic, for example, steel, stainless steel, copper, brass, aluminum or bronze. For example, the first nail prong 102, the second nail prong 104 and the member 106 may be comprised of one material, while the breakaway staple holding prong 110 is comprised of a second material that is different than the first material.

The first nail prong 102 and the second nail prong 104 may comprise a variety of lengths. The first nail prong 102 and the second nail prong 104 may comprise equal lengths or different lengths such that one of the first nail prong 102 and the second nail prong 104 is shorter than the other. For example, the first prong 102 may be approximately twenty-five percent shorter than the second nail prong 104.

Figure 4:
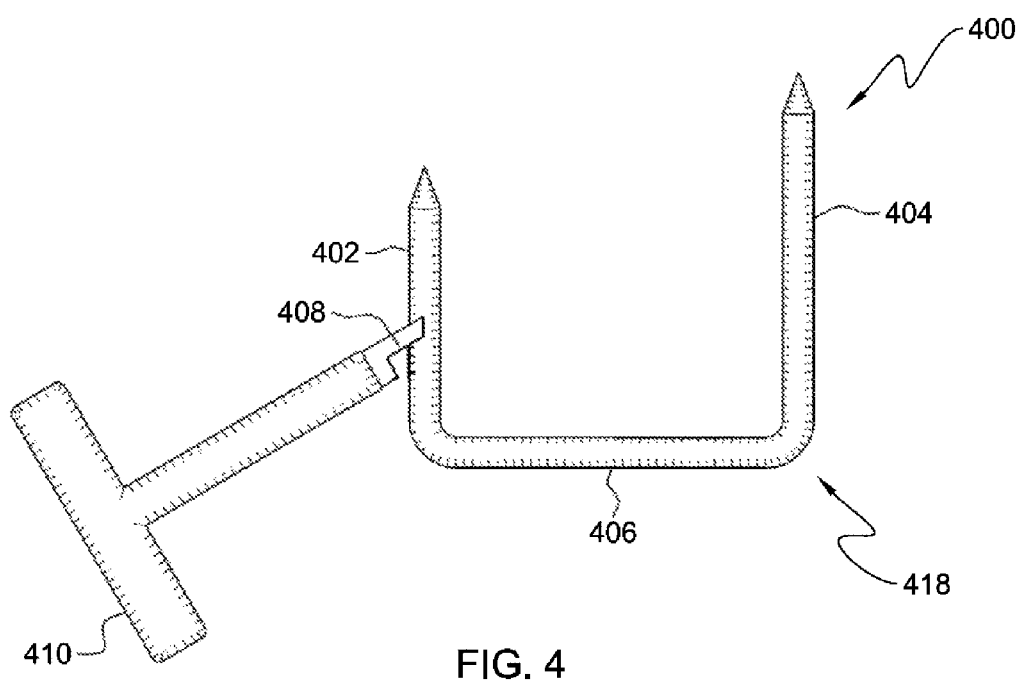
FIG. 4 is a front or back view of one example of a staple with a breakaway staple holding prong wherein one of the first nail prong and the second nail prong is shorter than the other in accordance with another aspect of the present invention.

As depicted in FIG. 4, the first nail prong 402 may be shorter than the second nail prong 404. In one embodiment, the breakaway staple holding prong 410 is releasably connected to the shorter of the first nail prong 402 and the second nail prong 404. The longer, second nail prong 404 may act as a guide or pilot to facilitate better driving and embedment of the staple 400 into the structure. The longer, second nail prong 404 may also allow a person to partially embed the staple 400 in a structure and then reposition the staple 400 by rotating the unembedded, shorter, first nail prong 402 prior to driving the entire staple 400 into the structure.

Figure 5:
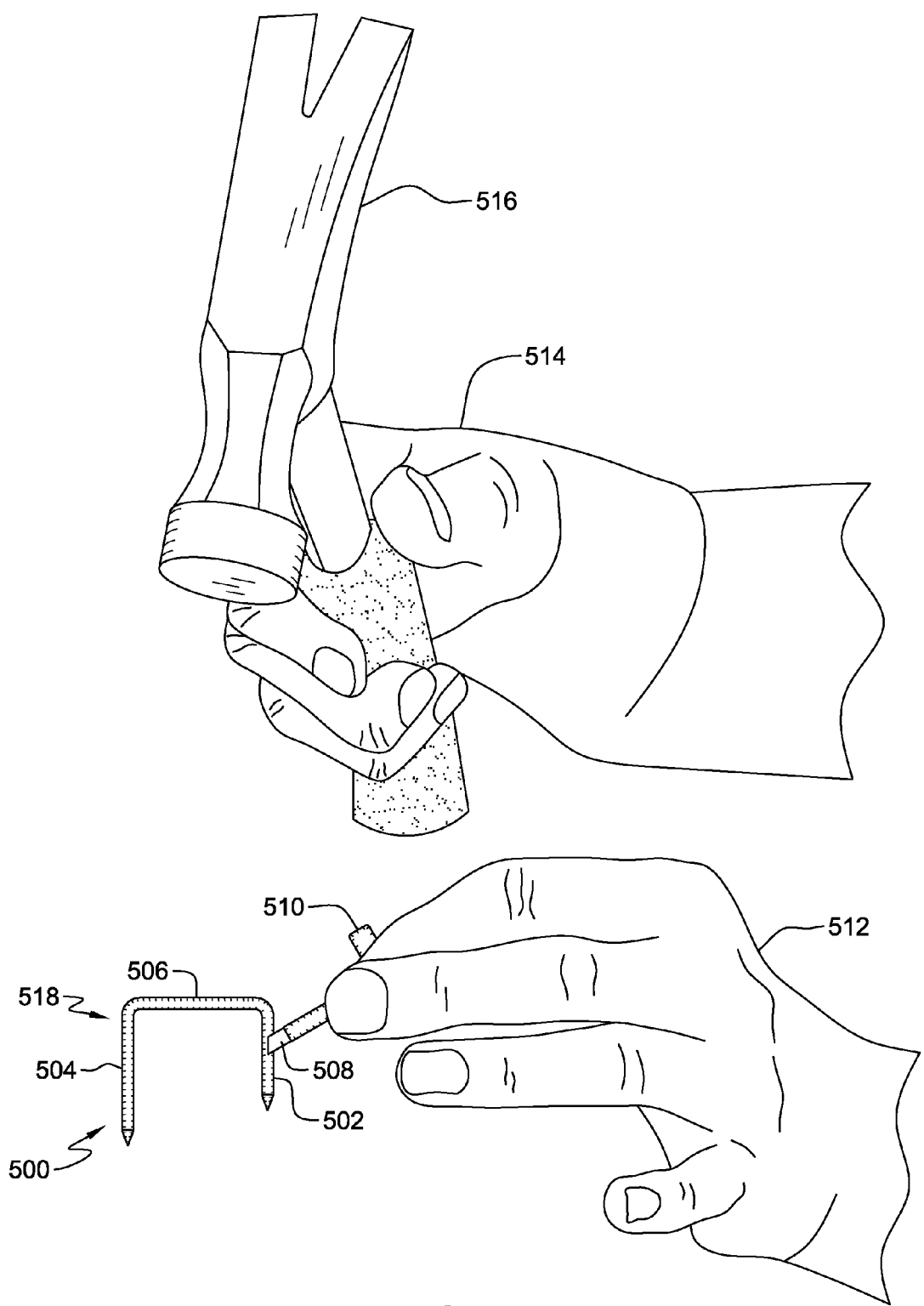
FIG. 5 depicts the staple with a breakaway staple holding prong of FIG. 4 as used by a person.

In one example, a person may utilize staple 500 (FIG. 5) by providing a staple 500, comprising: a first nail prong 502 and a second nail prong 504 connected by a member 506, thereby creating a substantially U-shaped body 518. The staple 500 further comprising a breakaway staple holding prong 510 connected to the substantially U-shaped body 518. A person then grasps the breakaway staple holding prong 510 using a first hand 512 to hold the staple 500 in a desired location for embedding same, and embeds the staple 500 in the desired location using a hammer 516 held in the second hand 514. The person may then remove the breakaway staple holding prong 510 after the embedding.

Although preferred embodiments have been described and depicted herein, it will be readily apparent to those skilled in this art, that various modifications, substitutions and changes can be made without departing from the scope of this invention, as defined by the appended claims.

The invention claimed is:

1. A staple, comprising: a first nail prong and a second nail prong connected by a member, creating a substantially U-shaped body, the staple further comprising a breakaway staple holding prong coupled to the substantially U-shaped body, wherein a weakened section is located on one of the first nail prong or the second nail prong.

2. The staple of claim 1, wherein the breakaway staple holding prong is substantially flat.

3. The staple of claim 1, wherein the breakaway staple holding prong is substantially T-shaped in cross-section.

4. The staple of claim 1, wherein the breakaway staple holding prong comprises a tab, the tab further comprising a free end and a second end that is coupled to the substantially u-shaped body.

5. The staple of claim 4, wherein the free end is disc-shaped.

6. The staple of claim 1, wherein the substantially U-shaped body comprises a substantially squared U-shaped body.

7. The staple of claim 1, wherein the substantially U-shaped body comprises a substantially rounded U-shaped body.

8. The staple of claim 1, wherein the breakaway staple holding prong is releasably connected to the substantially U-shaped body.

9. The staple of claim 1, wherein a portion of the breakaway staple holding prong is perforated.

10. The staple of claim 1, wherein the breakaway staple holding prong is partially detached from the substantially U-shaped body.

11. The staple of claim 1, wherein the breakaway staple holding prong is coupled to one of the first nail prong and the second nail prong.

12. The staple of claim 1, wherein the breakaway staple holding prong is sized and configured to allow a person to grasp the breakaway staple holding prong with his or her fingers.

13. The staple of claim 1, wherein one of the first nail prong and the second nail prong is shorter than the other.

14. The staple of claim 13, wherein the breakaway staple holding prong is coupled to the shorter of the first nail prong and the second nail prong.

15. The staple of claim 1, wherein a weakened section of the breakaway staple holding prong enables removal of the breakaway staple holding prong from the substantially U-shaped body.

16. The staple of claim 15, wherein the weakened section is located immediately adjacent the staple.

17. The staple of claim 1, wherein the first nail prong, the second nail prong and the member are one piece.

18. A method of embedding a staple, comprising:
providing a staple, comprising: a first nail prong and a second nail prong connected by a member, creating a substantially U-shaped body, the staple further comprising a breakaway staple holding prong coupled to the substantially U-shaped body, wherein a weakened section is located on one of the first nail prong or the second nail prong;
grasping the breakaway staple holding prong using one hand to hold the staple in a desired location for embedding same; and
embedding the staple in the desired location using the other hand.

19. The method of claim 18, further comprising removing the breakaway staple holding prong after the embedding.

\* \* \* \* \*